Ewing & De Ford.
Lock Nut.

Nº 94,585. Patented Sep. 7, 1869.

Witnesses.
Chas L Coombs
Hallet Kilbourn

Inventors.
W. P. Ewing & J. S. De Ford
per their Ass. Att. G. B. Towle

United States Patent Office.

W. P. EWING AND ISAAC S. DE FORD, OF ELKTON, MARYLAND.

Letters Patent No. 94,585, dated September 7, 1869.

IMPROVEMENT IN LOCK-NUT.

The Schedule referred to in these Letters Patent and making part of the same.

To all whom it may concern:

Be it known that we, W. P. EWING and ISAAC S. DE FORD, of Elkton, in the county of Cecil, and State of Maryland, have invented a new and improved Lock-Nut; and we do hereby declare that the following is a full, clear, and exact description of the construction and operation of the same, reference being had to the accompanying drawings, making a part of this specification.

Like letters, in both figures of the drawings, indicate like parts.

The nature of our invention consists in locking screw-nuts to bolts, so as to prevent their turning or becoming loose thereon, by means of a spanner, having jaws with bevelled edges, in combination with screw-nuts having similar edges.

We construct our invention as follows:

A and B represent two bars of rails, united by the plates a and b, above and below, or on either side thereof, bolts C and D being passed through the plates a and b and rails A and B, with heads or caps c and d and screw-nuts E and F, to fasten the plates, the said screw-nuts having their edges bevelled inwardly.

G is the spanner, having a jaw, e, at one end, and another, g, on the side next to the opposite end, the edges of both jaws being bevelled, to correspond with those of the nuts.

Figure 1:
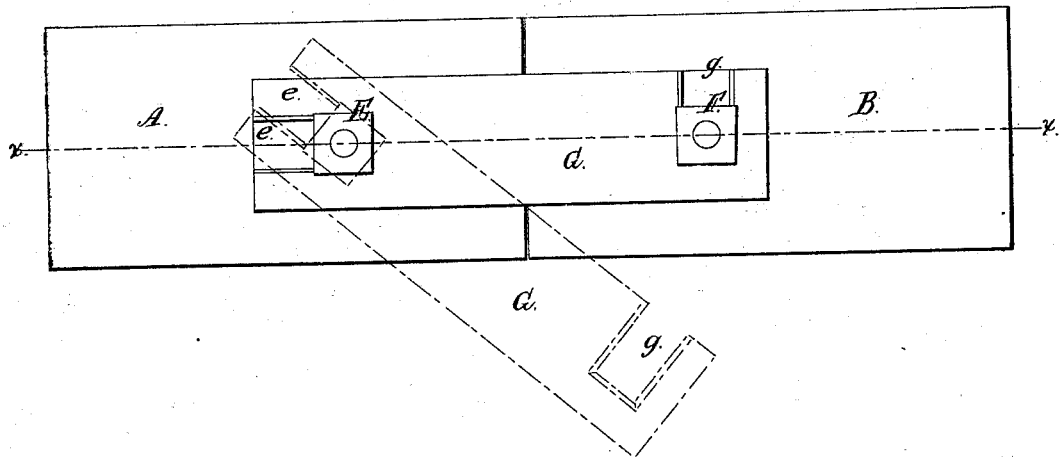
Figure 1 is a top view.
Figure 2:
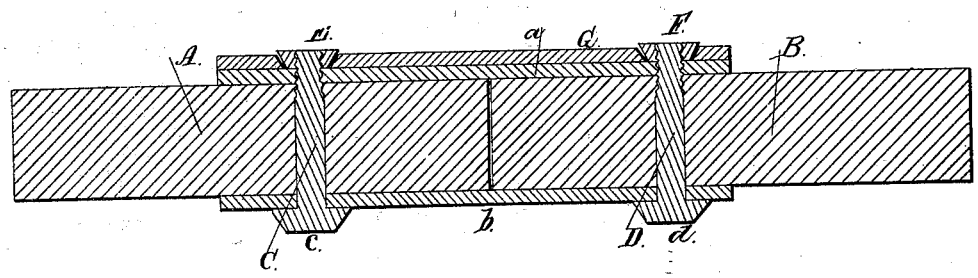
Figure 2 is a longitudinal section, as indicated by the line x–x of fig. 1.

Thus, to lock the nuts, one of them is turned cornerwise, and the spanner slipped on to it, (see red lines, fig. 1.) The spanner is then turned and made to embrace the opposite nut, at the same time bringing the first nut squarely around with the other.

This mode of locking the nuts will be found to be of great advantage in railroad, or other machinery where a lock-nut can be used, particularly in connecting the ends of the rails of a railroad, by means of what is known as the "fish-joint," the spanner rendering it impossible for the nuts to turn or become loose on the bolts.

Claim.

Having thus fully described our invention,

What we claim therein as new, and desire to secure by Letters Patent, is—

The spanner G, with jaws e and g, having bevelled edges, in combination with the screw-nuts E and F, having similar edges, substantially as described.

W. P. EWING.
ISAAC S. DE FORD.

Witnesses:
NOBLE T. BIDDLE,
E. WESLEY JANNEY.